Patented Mar. 15, 1938

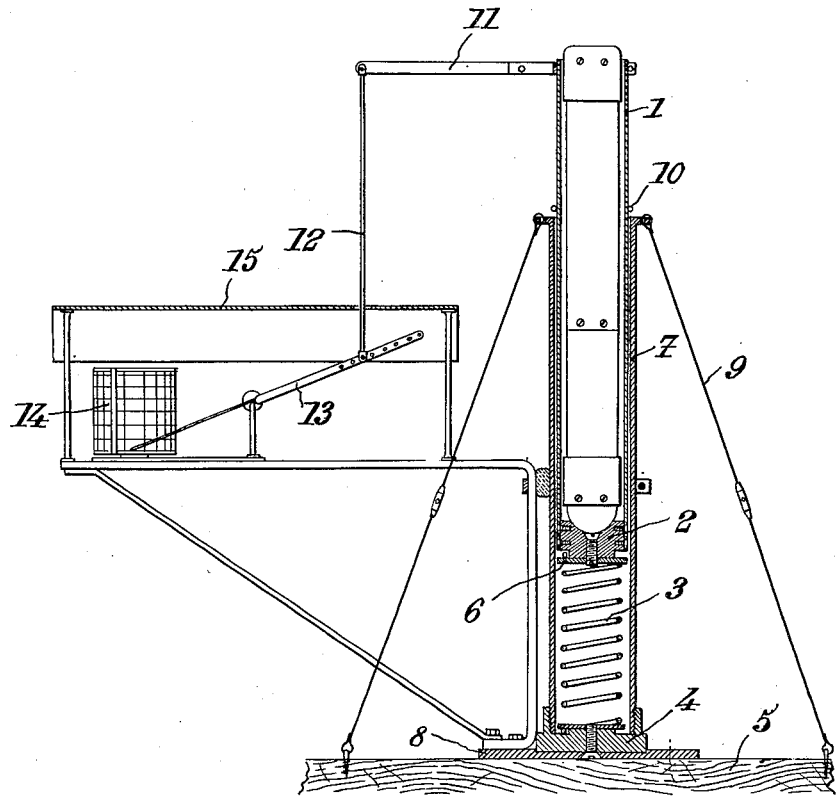

2,111,315

UNITED STATES PATENT OFFICE 2,111,315

FORCE MEASURING DEVICE FOR ROCKETS

Louis Damblanc, Paris, France

Application February 26, 1936, Serial No. 65,909
In Belgium February 28, 1935

3 Claims. (Cl. 265—2)

The present invention relates to systems for testing reaction apparatus, that is to say apparatus in which reaction forces are produced, for instance, by the combustion of a powder or the expansion of a gas. The invention is more especially, although not exclusively, concerned with systems for testing rockets.

The object of the present invention is to provide a system of the type above referred to which is better adapted to meet the requirements of practice than systems used for this purpose up to the present time.

The essential feature of the present invention consists in constituting the system above mentioned by, on the one hand, an elastic abutment adapted to accommodate the nose of the apparatus to be tested during the working thereof, and, on the other hand, a time recording device to record movements of this abutment.

Other features of the present invention will result from the following detailed description of a specific embodiment thereof.

A preferred embodiment of the present invention will be hereinafter described, with reference to the accompanying drawing, given merely by way of example, and in an elevational view, with parts shown in section, an apparatus for testing rockets, made according to the present invention.

For the sake of clarity, in the following description, it will be supposed that the system is intended for testing rockets with a view to measuring at any time the force transmitted to a rocket by the combustion of the powder it contains, but it will be readily understood that all that is said in the following description applies to the testing of analogous apparatus in which similar reactions are produced.

The essential parts of the system according to the present invention consist in a movable abutment, adapted to accommodate the nose of the apparatus (rocket) to be tested, and a device for recording, as a function of time, the positions occupied by said abutment in the course of the operation of the apparatus to be tested, so as to indicate the position of said abutment at any time.

I will first consider the movable abutment above referred to.

This abutment includes a combustion chamber intended to accommodate the rocket and which consists, for instance, of a tube 1 open at one of its ends so as to allow the products of the combustion to escape freely, said tube being provided, at its other end, with a bottom or end part 2 intended to receive and to transmit the reaction forces that result from the working of the rocket or similar apparatus.

In combination with this abutment proper, I provide a device capable of undergoing elastic deformations a correlation being determined, preferably in advance through calculation or experiments, between the amplitude of the deformations and the numeral values of the forces that produce these deformations. This device may include various means (torsional springs, fluid compressors, etc.) but advantageously it includes, according, for instance, to the embodiment shown in the drawing and which will be more particularly considered hereinafter, a coil spring 3 bearing upon thrust support 4 rigid with the frame of the system.

Finally, I provide kinematic connections for transmitting to this elastic device the thrust imparted to the combustion chamber. Eventually, these kinematic connections may be so devised as to multiply or reduce said thrust.

In the embodiment shown by the drawing, the thrust is transmitted to spring 3, the above mentioned connections consisting, for instance, of a small plate 6 which makes the bottom 2 of the combustion chamber rigid with the top of spring 3. In this embodiment, guiding means, consisting for instance of a tube 7, are provided for guiding the displacements of combustion chamber 1 and spring 3.

All these elements are mounted in a frame 5 which is devised in such manner that it can be embedded in a mass of earth or masonry, the system being preferably located in the open. These elements may, for instance, be mounted on an assembly of sectional irons and beams, through a plate or sleeve 8, with the provision of stay wires 9 for keeping tube 7 in position.

It is clear that with an arrangement of this kind any effort exerted on the bottom 2 of tube 1 will result in a compression of spring 3 and a displacement of tube 1. The size of the spring may be varied in accordance with the force to be measured. Tube 1 carries an indicating collar 10. This collar engages the guide tube 7 upon deflection of tube 1 and is moved along the tube to a position indicative of the maximum thrust or deflection of the tube.

However interesting it may be to know the value of this maximum thrust, it is still more interesting to know the variations of this thrust as a function of time, so that I advantageously make use of a time responsive recording device.

Of course, this recording device may be made in many various manners.

For instance, according to the embodiment shown by the drawing, tube 1 is provided with an arm 11 adapted to transmit through a positive connection, for instance through a rod 12, the displacements of said tube 1 to a pointer 13 capable of marking these displacements on a drum 14 driven by a clockwork mechanism, these elements being those of an ordinary mechanical recorder. The graph thus obtained, which may be graduated directly in forces gives the curve of the reactions of the rocket as a function of time.

The recording device may be provided with any protection such for instance as a roof 15.

In a general way, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the accompanying claims.

What I claim is:

1. In a device for testing the reaction of rockets and the like which comprises, in combination, a stationary frame, a vertical guide carried by said frame, a combustion chamber open at one end and movable in said guide and provided at its other end with an abutment adapted to accommodate the front part of a rocket or the like, a spring disposed between the frame and the abutment for limiting the displacements of the abutment, means for connecting the abutment of said combustion chamber with said spring, and means for recording the displacement of said combustion chamber as a function of time.

2. In a device for testing the reaction of rockets and the like which comprises, in combination, a stationary frame, a vertical guide carried by said frame, a combustion chamber open at one end and movable in said guide and provided at its other end with an abutment adapted to accommodate the front part of a rocket or the like, a spring disposed between the frame and the abutment for limiting the displacements of the abutment, means for connecting the abutment of said combustion chamber with said spring, means for recording the displacement of said combustion chamber as a function of time, and means for indicating the maximum displacement of said abutment.

3. In a device for testing the reaction of rockets and the like which comprises, in combination, a stationary frame, a vertical guide carried by said frame, a combustion chamber open at one end and movable in said guide and provided at its other end with an abutment adapted to accommodate the front part of a rocket or the like, elastic means disposed between the frame and the abutment for limiting the displacements of the abutment, means for connecting the abutment of said combustion chamber with said elastic means, and means for recording the displacement of said combustion chamber as a function of time.

LOUIS DAMBLANC.